United States Patent
Lin et al.

(10) Patent No.: US 12,061,669 B2
(45) Date of Patent: Aug. 13, 2024

(54) MANUFACTURING DATA ANALYZING METHOD AND MANUFACTURING DATA ANALYZING DEVICE

(71) Applicant: UNITED MICROELECTRONICS CORP., Hsinchu (TW)

(72) Inventors: Ching-Pei Lin, Hsinchu County (TW); Ming-Tsung Yeh, Taipei (TW); Chuan-Guei Wang, Yunlin County (TW); Ji-Fu Kung, Taichung (TW)

(73) Assignee: UNITED MICROELECTRONICS CORP, Hsinchu (TW)

( * ) Notice: Subject to any disclaimer, the term of this patent is extended or adjusted under 35 U.S.C. 154(b) by 555 days.

(21) Appl. No.: 17/343,798

(22) Filed: Jun. 10, 2021

(65) Prior Publication Data

US 2022/0398410 A1    Dec. 15, 2022

(51) Int. Cl.
*G06F 18/2134* (2023.01)
*G06F 18/2137* (2023.01)
*G06N 5/04* (2023.01)
*G06V 20/62* (2022.01)

(52) U.S. Cl.
CPC .... *G06F 18/21345* (2023.01); *G06F 18/2137* (2023.01); *G06N 5/04* (2013.01); *G06V 20/635* (2022.01)

(58) Field of Classification Search
CPC .......... G06F 18/21345; G06F 18/2137; G06V 20/635; G06N 5/04
See application file for complete search history.

(56) References Cited

U.S. PATENT DOCUMENTS

| | | | |
|---|---|---|---|
| 5,257,268 A * | 10/1993 | Agrawal | G01R 31/318342 714/738 |
| 6,564,202 B1 | 5/2003 | Schuetze et al. | |
| 8,140,584 B2 | 3/2012 | Guha | |
| 11,151,710 B1 * | 10/2021 | Schleyen | G06T 7/0004 |
| 11,734,584 B2 * | 8/2023 | A R | G06N 5/04 706/25 |
| 2015/0125970 A1 * | 5/2015 | Chen | H01L 22/10 438/14 |
| 2019/0096057 A1 * | 3/2019 | Allen | G01N 21/8851 |
| 2020/0249651 A1 * | 8/2020 | Lee | G06N 3/045 |
| 2021/0209749 A1 * | 7/2021 | Pan | G01R 31/2894 |
| 2022/0130544 A1 * | 4/2022 | Zhang | G16H 50/70 |
| 2022/0366179 A1 * | 11/2022 | Zagaynov | G06V 10/993 |
| 2022/0398410 A1 * | 12/2022 | Lin | G06F 18/21345 |

(Continued)

OTHER PUBLICATIONS

Sun et al., 2005, "A new method of feature fusion and its application in image recognition" (pp. 2437-2448) (Year: 2005).*

(Continued)

*Primary Examiner* — Manav Seth
(74) *Attorney, Agent, or Firm* — WPAT, P.C

(57) ABSTRACT

A manufacturing data analyzing method and a manufacturing data analyzing device are provided. The manufacturing data analyzing method includes the following steps. Each of at least one numerical data, at least one image data and at least one text data is transformed into a vector. The vectors are gathered to obtain a combined vector. The combined vector is inputted into an inference model to obtain a defect cause and a modify suggestion.

7 Claims, 7 Drawing Sheets

(56) References Cited

U.S. PATENT DOCUMENTS

2023/0022566 A1* 1/2023 Furusho .............. G06N 3/0455

OTHER PUBLICATIONS

Anbumony et al., 2006, "A Brief Overview of Test Vector Compaction Methods for Combinational Circuits" (pp. 1-11) (Year: 2006).*
Shukoor et al., 2009, "A Two Phase Approach for Minimal Diagnostic Test Set Generation" (pp. 115-120) (Year: 2009).*
Zeng et al., 2017, "Fault detection in an engine by fusing information from multivibration sensors" (pp. 1-9) (Year: 2017).*
Khera et al., 2019, "A heuristic fault based optimization approach to reduce test vectors count in VLSI testing" (pp. 229-234) (Year: 2019).*
Lu et al., 2019, "Multi-Modal Multi-Scale Deep Learning for Large-Scale Image Annotation" (pp. 1720-1731) (Year: 2019).*
Miller et al., 2020, "Multi-Modal Classification Using Images and Text" (pp. 1-30) (Year: 2020).*

* cited by examiner

MANUFACTURING DATA ANALYZING METHOD AND MANUFACTURING DATA ANALYZING DEVICE

TECHNICAL FIELD

The disclosure relates in general to a data analyzing method and a data analyzing device, and more particularly to a manufacturing data analyzing method and a manufacturing data analyzing device.

BACKGROUND

Along with the development of semiconductor technology, varies semiconductor devices are invented. For example, chips, memories and MEMS are widely used in electronic devices. The design of the chips, memories or MEMS becomes quite complicated. For increasing the yield rate of the semiconductor process, the manufacturing data is manually analyzed to obtain the defect cause and the modify suggestion.

However, in traditional, only one manufacturing data is analyzed, so the defect cause cannot be obtained accurately. Even if the semiconductor process is modified and then another manufacturing data is further analyzed, the modify suggestion may not be correct.

SUMMARY

The disclosure is directed to a manufacturing data analyzing method and a manufacturing data analyzing device. Three kinds of heterogeneous data are analyzed at the same time, so the defect cause and the modify suggestion can be accurately obtained.

According to one embodiment, a manufacturing data analyzing method is provided. The manufacturing data analyzing method includes the following steps. Each of at least one numerical data, at least one image data and at least one text data is transformed into a vector. The vectors are gathered to obtain a combined vector. The combined vector is inputted into an inference model to obtain a defect cause and a modify suggestion.

According to another embodiment, a manufacturing data analyzing device is provided. The manufacturing data analyzing device includes a plurality of judgers, a gathering unit and an inference model. The judgers are configured to transform at least one numerical data, at least one image data and at least one text data into a plurality of vectors respectively. The gathering unit is configured to gather the vectors to obtain a combined vector. The inference model is configured to receive the combined vector and then obtain a defect cause and a modify suggestion.

Figure 1:
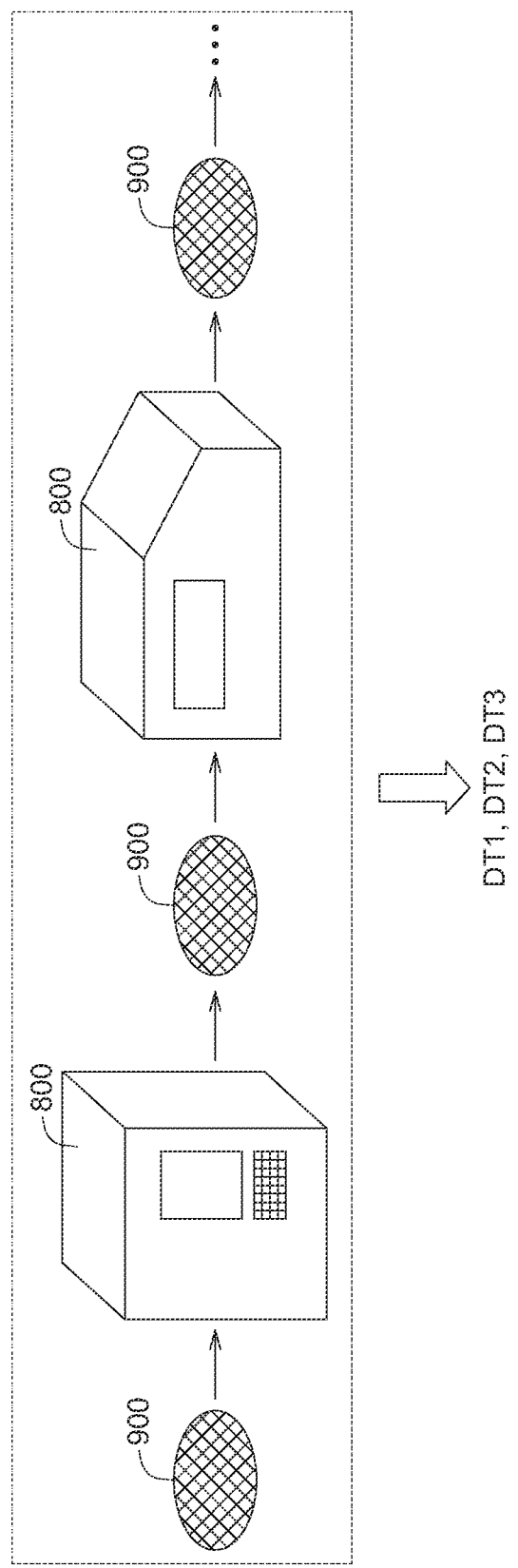
FIG. 1 shows one example of the semiconductor process.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows one example of a semiconductor process. As shown in FIG. 1, a wafer 900 is processed via a plurality of manufacturing apparatuses 800, such as etching apparatus, deposition apparatus or annealing apparatus. The semiconductor process is complexed and the defect cause is not easy to find. During the manufacturing process, many manufacturing data, such as a plurality of numerical data DT1, a plurality of image data DT2 and a plurality of text data DT3 are collected. Please refer to Table I. The numerical data DT1 include die stack data, reticle stack data, slot effect data, Energy-dispersive X-ray spectroscopy (EDX) data, method detection limit (MDL) data, killer die ratio data, bad die ratio data, yield loss data, and non-product wafer (NPW) chart data. The image data DT2 include Spatial Signature Analysis (SSA) data, NPW map data, defect shape data, defect interaction data, background location data, and MDL map data. The text data DT3 include purpose data, hold comment data, similar case data, inline abnormal data, and process abnormal data.

TABLE I

| numerical data DT1 | image data DT2 | text data DT3 |
|---|---|---|
| die stack data | Spatial Signature Analysis (SSA) data | purpose data |
| reticle stack data | NPW map data, defect shape data | hold comment data |
| slot effect data | defect interaction data | similar case data |
| Energy-dispersive X-ray spectroscopy (EDX) data | background location data | inline abnormal data |
| method detection limit (MDL) data | MDL map data | process abnormal data |
| killer die ratio data | | |
| bad die ratio data | | |
| yield loss data | | |
| non-product wafer (NPW) chart data | | |

Figure 2:
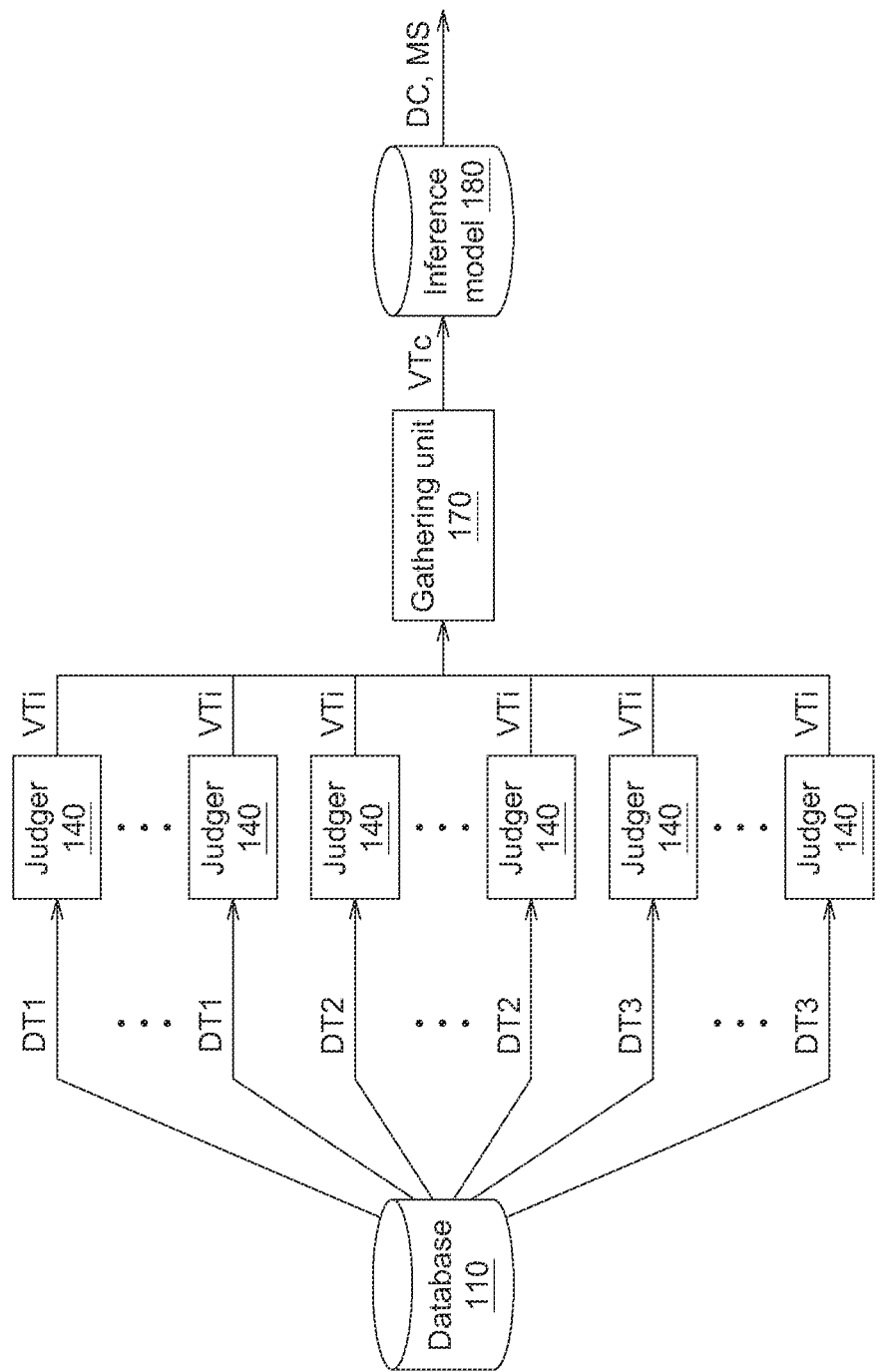
FIG. 2 shows a block diagram of a manufacturing data analyzing device according to one embodiment.

Please referring to FIG. 2, which shows a block diagram of a manufacturing data analyzing device 100 according to one embodiment. The manufacturing data analyzing device 100 includes a database 110, a plurality of judgers 140, a gathering unit 170 and an inference model 180. The function of each component is briefly described as follows. The database 110 is used to store data. For example, the database 110 is a memory, a hard disk or a cloud data center. The judgers 140 are used to transform data. The gathering unit 170 is used to gather the transformed data. The inference model 180 is used to analyze the transformed data via an artificial intelligence algorithm. In the present embodiment, all of the numerical data DT1, the image data DT2 and the text data DT3 are analyzed at the same time, so the defect cause and the modify suggestion can be accurately obtained. The operation of those elements is explained via a following flowchart.

Figure 3:
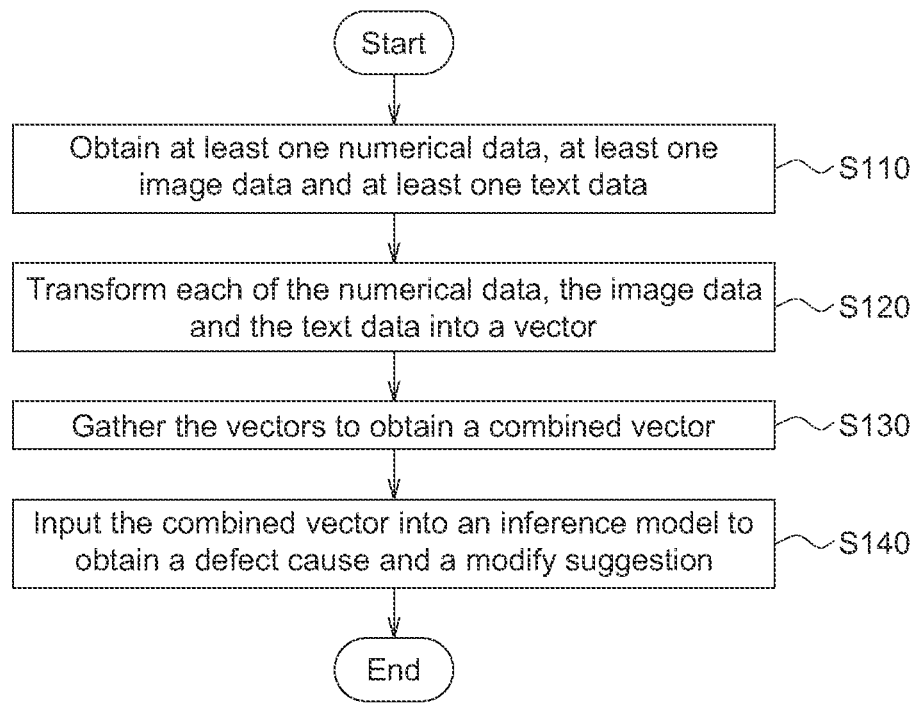
FIG. 3 shows a flowchart of a manufacturing data analyzing method according to one embodiment.

Please refer to FIG. 3, a flowchart of a manufacturing data analyzing method according to one embodiment is shown. In step S110, the numerical data DT1, the image data DT2 and the text data DT3 are obtained from the database 110. The numerical data DT1 include the die stack data, the reticle stack data, the slot effect data, the Energy-dispersive X-ray spectroscopy (EDX) data, the method detection limit (MDL) data, the killer die ratio data, the bad die ratio data, the yield loss data, and the non-product wafer (NPW) chart data. Any of the numerical data DT1 may be collected at single station in the manufacturing process or may be collected through the whole of the manufacturing process. The different numerical data DT1 may have different sizes. The different numerical data DT1 may have different forms. The different numerical data DT1 stored in the database 110 may be presented in different numeric strings or different numeric charts.

The image data DT2 include the Spatial Signature Analysis (SSA) data, the NPW map data, the defect shape data, the defect interaction data, the background location data, and the MDL map data. Any of the image data DT2 may be collected at single station in the manufacturing process or may be collected through the whole of the manufacturing process. The different image data DT2 may have different resolutions. The different image data DT2 may have different types. Any of the image data DT2 stored in the database 110 may be presented in a gray scale image, a color image, or a dot plot.

The text data DT3 include the purpose data, the hold comment data, the similar case data, the inline abnormal data, and the process abnormal data. The text data DT3 may be collected at single station of the manufacturing process or may be collected through the whole of the manufacturing process. The text data DT3 may have different sizes. The text data DT3 may have different languages. Any of the text data DT3 stored in the database 110 may be presented in string, text table or voice recording.

Next, in step S120, each of the judgers 140 transforms one of the numerical data DT1, the image data DT2 and the text data DT3 into a vector VTi. The judgers 140 transform the numerical data DT1, the image data DT2 and the text data DT3 by different ways.

Figure 4:
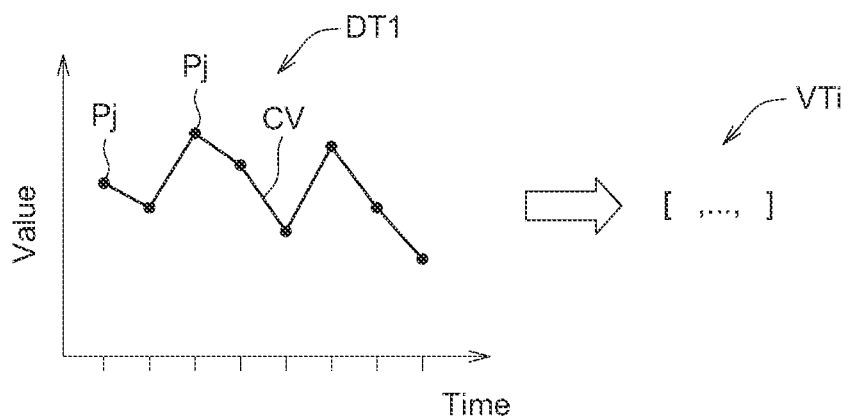
FIG. 4 illustrates one example of transforming the numerical data into the vector.

Please refer to FIG. 4, which illustrates one example of transforming the numerical data DT1 into the vector VTi. As shown in FIG. 4, the numerical data DT1 stored in the database 110 is, for example, a numerical curve CV. The numerical values on the numerical curve CV can be captured in order of time and recorded as the vector VTi. The size of this vector VTi is equal to the number of a plurality of points Pj on the numerical curve CV. The number of the points Pj is predetermined, so the size of this vector VTi is predetermined.

Figure 5:
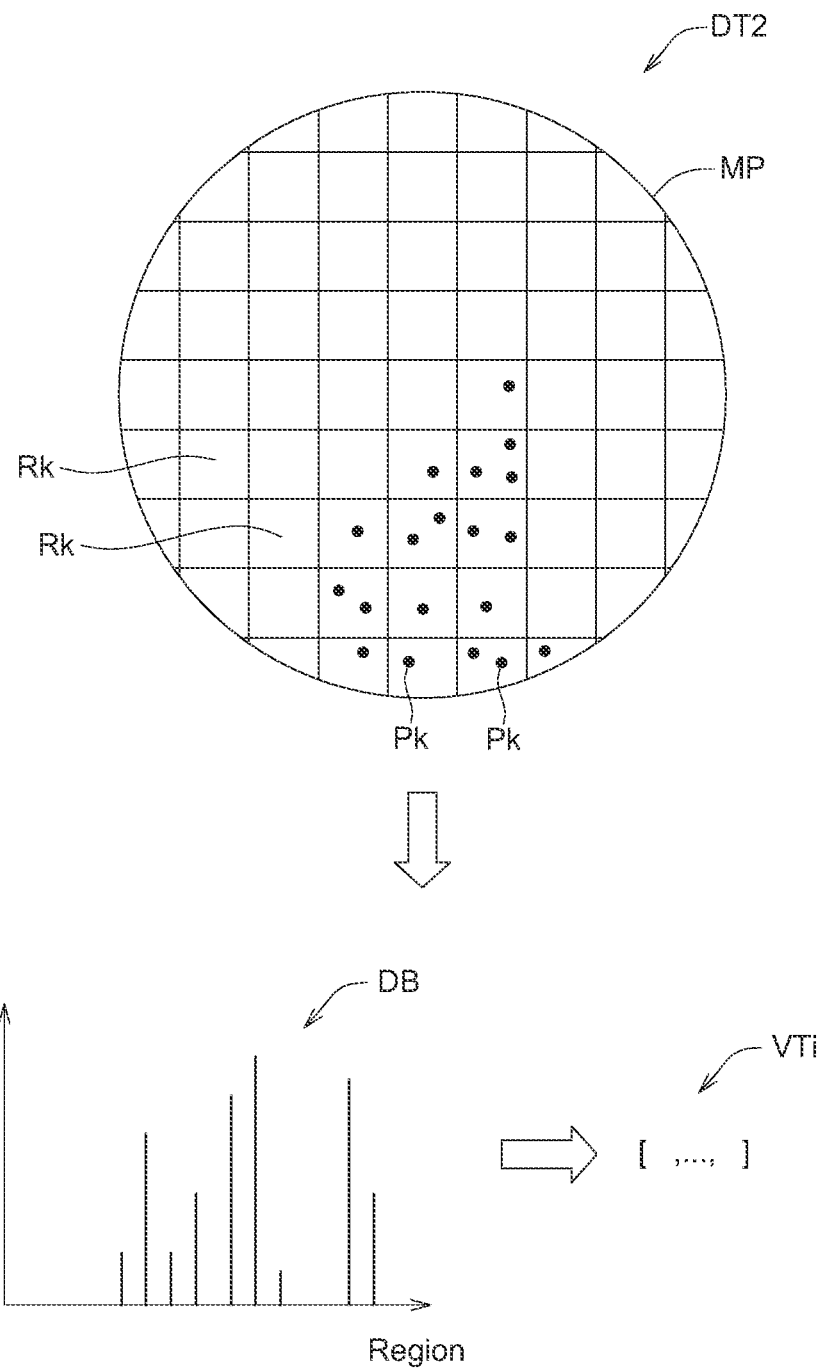
FIG. 5 illustrates one example of transforming the image data into the vector.

Please refer to FIG. 5, which illustrates one example of transforming the image data DT2 into the vector VTi. As shown in FIG. 5, the image data DT2 stored in the database 110 is, for example, a NPW map data MP. The number of a plurality of defect points Pk is accumulated in each region Rk and recorded as a distribution chart DB. Then the numbers corresponding the regions Rk are recorded as the vector VTi. The size of this vector VTi is equal to the number of regions Rk arranged on the NPW map data MP. The number of the regions Rk is predetermined, so the size of this vector VTi is predetermined.

Figure 6:
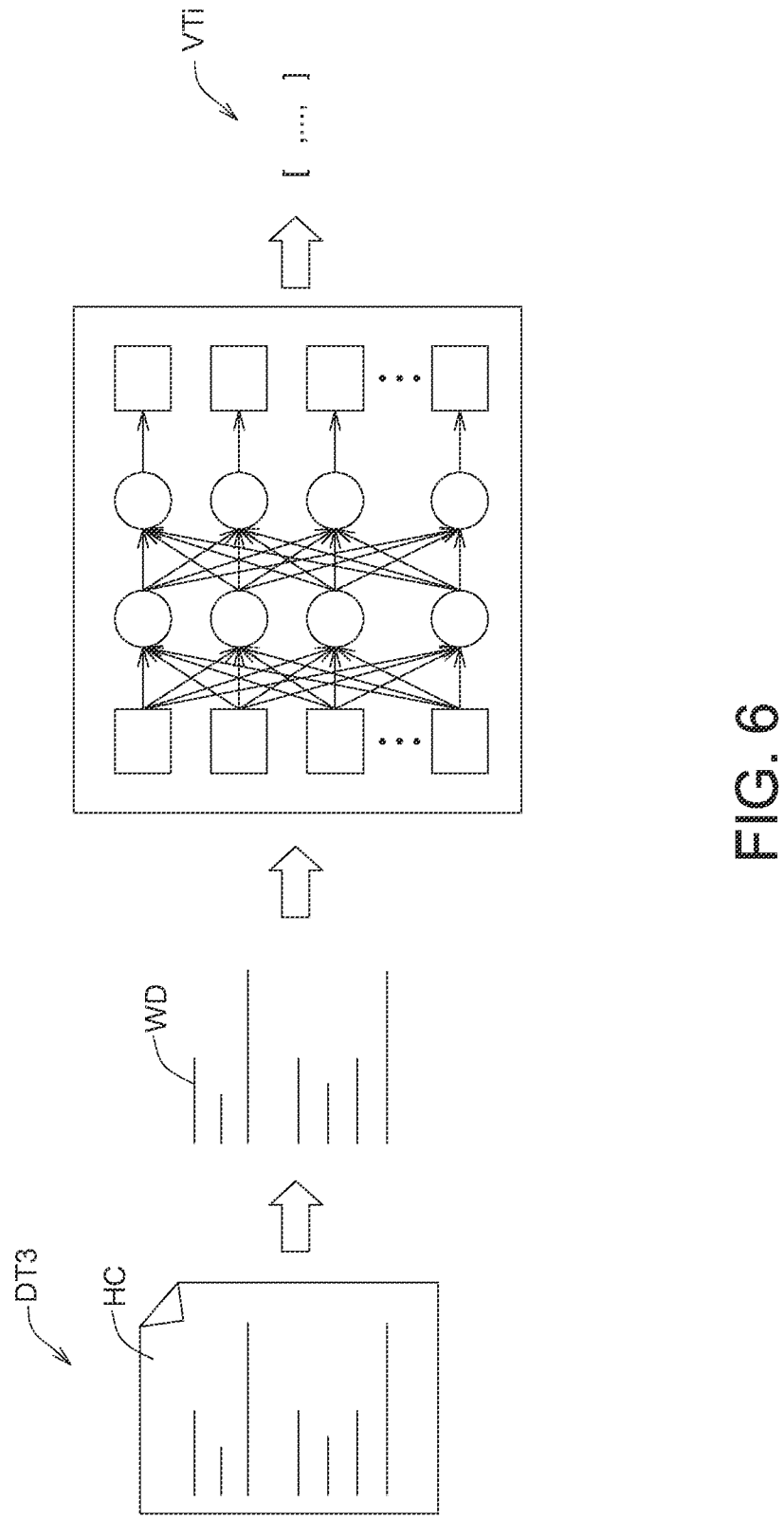
FIG. 6 illustrates one example of transforming the text data into the vector.

Please refer to FIG. 6, which illustrates one example of transforming the text data DT3 into the vector VTi. As shown in FIG. 6, the text data DT3 stored in the database 110 is, for example, a hold comment HC. The wordings WD are captured from the hold comment HC. Then, the wordings WD are transformed to the vector VTi via a Bidirectional Encoder Representations from Transformers (BERT) algorithm.

Figure 7:
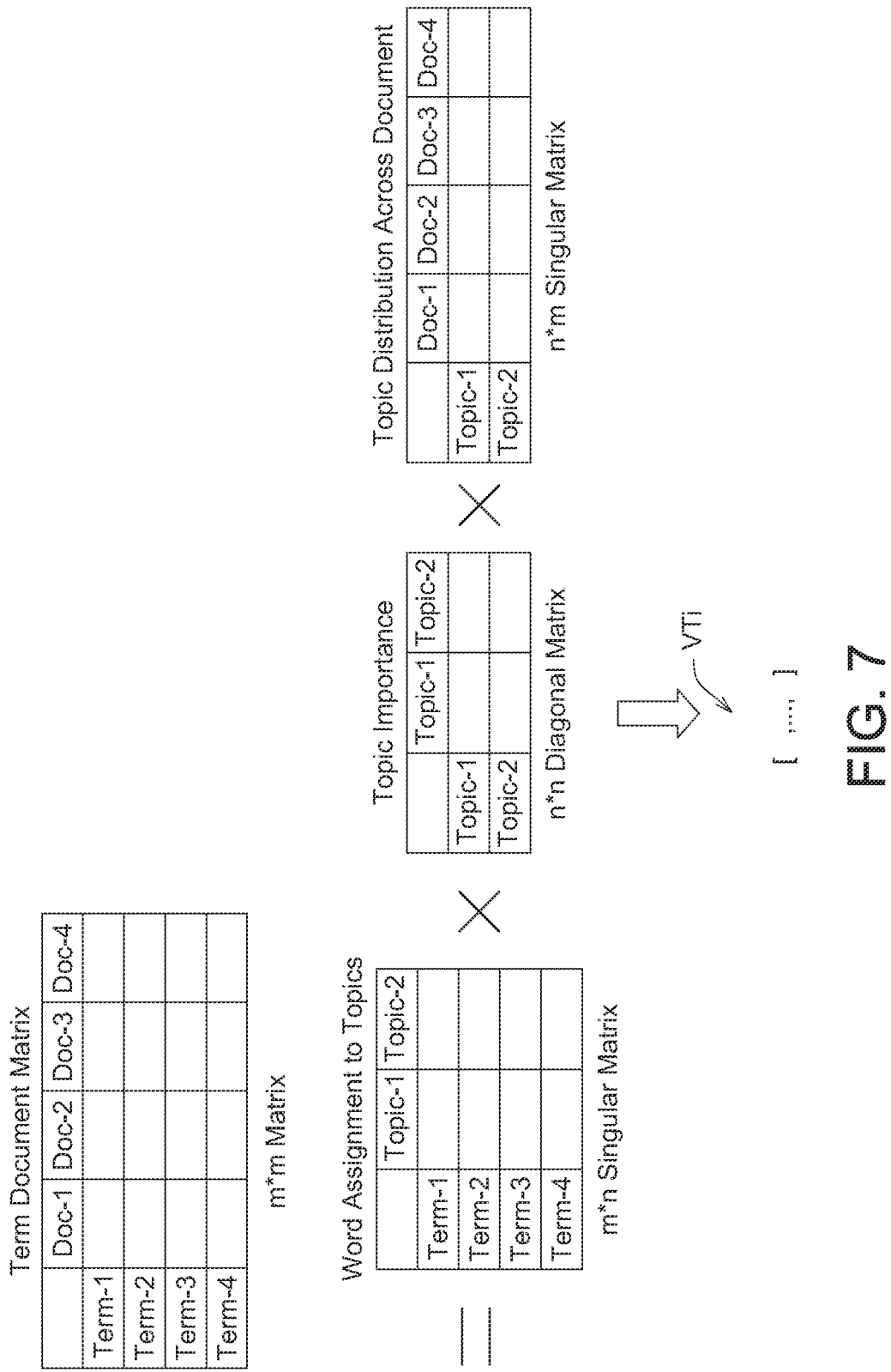
FIG. 7 illustrates another example of transforming the text data into the vector.

Please refer to FIG. 7, which illustrates another example of transforming the text data DT3 into the vector VTi. As shown in FIG. 7, the text data DT3 is, for example, an inline abnormal data. A Latent Semantic Analysis (LSA) algorithm can be used to find the hidden topics represented by the document or the text. This hidden topics for clustering the similar document together are used to generate the vector VTi.

In one embodiment, the number of the numerical data DT1 is 9, the number of the image data DT2 is 6 and the number of the text data DT3 is 5, so 20 judgers 140 may be used for transforming the 9 numerical data DT1, the 6 image data DT2, and the 5 text data DT3 into 20 vectors VTi by 20 different ways.

Figure 8:
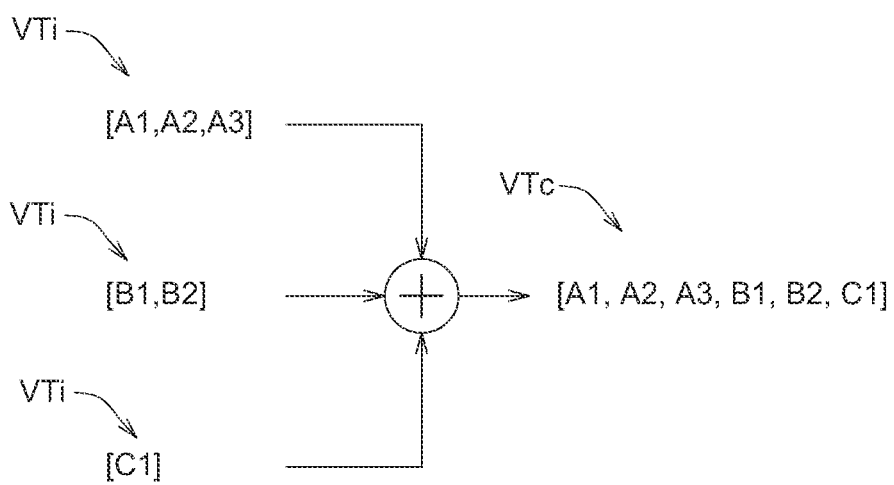
FIG. 8 shows an example of gathering three vectors.

Next, in step S130, the gathering unit 170 gathers the vectors VTi to obtain a combined vector VTc. In one embodiment, the gathering unit 170 connects the vectors VTi in a predetermined order. Please refer to FIG. 8, which shows an example of gathering three vectors VTi. For example, the lengths of the three victors VTi are different. The victors VTi are gathered from top to bottom and the combined vector VTc whose length is 6 is obtained.

Then, the combined vector VTc is inputted into the inference model 180 to obtain a defect cause DC and a modify suggestion MS. During the analysis of the inference model 180, all of the numerical data DT1, the image data DT2 and the text data DT3 are considered in parallel. Therefore, any factors during the manufacturing process can be considered at the same time without multiple analysis.

Further, the inference model 180 can be retrained according to defect cause DC and the modify suggestion MS for increasing the accuracy of the inference model 180.

Based on above, all of the numerical data DT1, the image data DT2 and the text data DT3 which are heterogeneous are analyzed at the same time, so the defect cause DC and the modify suggestion MS can be accurately obtained.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A manufacturing data analyzing method, comprising:
transforming each of at least one numerical data, at least one image data and at least one text data into a vector, wherein one of the text data is transformed via a Bidirectional Encoder Representations from Transformers (BERT) algorithm;
gathering the vectors to obtain a combined vector; and
inputting the combined vector into an inference model to obtain a defect cause and a modify suggestion.

2. The manufacturing data analyzing method according to claim 1, wherein the vectors are connected in a predetermined order.

3. The manufacturing data analyzing method according to claim 1, wherein one of the text data is transformed via a Latent Semantic Analysis (LSA) algorithm.

4. The manufacturing data analyzing method according to claim 1, wherein one of the image data is transformed via a distribution chart.

5. The manufacturing data analyzing method according to claim 1, wherein the numerical data include die stack data, reticle stack data, slot effect data, Energy-dispersive X-ray spectroscopy (EDX) data, method detection limit (MDL) data, killer die ratio data, bad die ratio data, yield loss data, and non-product wafer (NPW) chart data.

6. The manufacturing data analyzing method according to claim 1, wherein the image data include Spatial Signature Analysis (SSA) data, NPW map data, defect shape data, defect interaction data, background location data, and MDL map data.

7. The manufacturing data analyzing method according to claim 1, wherein the text data include purpose data, hold comment data, similar case data, inline abnormal data, and process abnormal data.

\* \* \* \* \*